United States Patent [19]

Deken

[11] 4,422,794
[45] Dec. 27, 1983

[54] COUPLING FOR EARTH BORING UNITS

[75] Inventor: Arthur D. Deken, Perry, Okla.

[73] Assignee: The Charles Machine Works, Inc., Perry, Okla.

[21] Appl. No.: 285,501

[22] Filed: Jul. 21, 1981

[51] Int. Cl.³ .................. B25G 3/18; F16B 21/00; F16D 1/00
[52] U.S. Cl. ................................. 403/330; 292/128
[58] Field of Search ............. 403/330, 327, 326, 325, 403/343, 342, 407; 292/128

[56] References Cited

U.S. PATENT DOCUMENTS

| | | | |
|---|---|---|---|
| 2,067,329 | 1/1937 | McGuffin | 403/327 X |
| 2,379,472 | 7/1945 | Bowman | 403/327 |
| 2,553,835 | 5/1951 | Sachs | 403/327 X |
| 4,226,035 | 10/1980 | Saito | 403/305 X |

FOREIGN PATENT DOCUMENTS 576458 10/1977 U.S.S.R. ........................... 403/305

Primary Examiner—Wayne L. Shedd
Attorney, Agent, or Firm—Schuyler, Banner, Birch, McKie & Beckett

[57] ABSTRACT

A coupling for coaxially joining pipe or rod sections employed with an earth boring drive unit includes telescopically interengageable male and female members having mating irregular cross sectional portions drivingly cooperable to transmit torque between said members and releasable locking means carried by said members to lock them against axial separation from each other, such locking means including an outwardly biased latch pivotally mounted in a pocket on the exterior of the male member and an inwardly opening recess on the interior of the female member into which the latch moves and lockingly engages when the members are telescopically interengaged for transmitting axial tension loads through the coupling.

4 Claims, 4 Drawing Figures

COUPLING FOR EARTH BORING UNITS

BACKGROUND OF THE INVENTION

The invention relates generally to the art of earth boring through subterranean areas, such as beneath sidewalks, roadways, etc. More particularly, the invention is concerned with a coupling to be utilized in coaxially joining pipe or rod sections which coupled sections are then driven by an earth boring drive unit to carry out the boring operation.

The type boring operations contemplated herein are particularly useful in laying pipelines or other conduits beneath paved highway or sidewalk surfaces in that they avoid the necessity of digging up the ground surface to form a trench for the conduit with resulting need for back filling the earth and possibly then repaving the surface over the trench location. To exemplify the type boring operation in which the coupling invention herein may advantageously be used, note may be made of Martin et al U.S. Pat. No. 4,000,879 which discloses a pushing or pulling apparatus and Kandle U.S. Pat. No. 2,639,931 which discloses a rotary drilling approach to earth boring. Both use a sectionalized pipe or rod with the sections being coaxially coupled to successively increase the length of pipe or rod required for earth boring. But, as will be apparent from the following disclosure, the coupling of this invention is useful primarily in rotary boring operations where the pipe or rod must be pushed and pulled, but the primary power transmission is in rotating the pipe or rod.

In the above types of boring operations, it will be readily appreciated that the coupling employed between the adjoining ends of the pipe or rod sections that must be coaxially connected is subjected to severe stresses in driving the coupled sections through the earth. The typical boring operation requires the coupling and uncoupling of several sections of drill pipe or rod which can be a time consuming and difficult operation. Still, the coupling joint has to be capable of withstanding the severe stresses that are encountered in boring to provide a reliable joint which will hold the pipe or rod sections together while the boring is taking place. Typically in these boring operations the first section of drill pipe or rod is connected to the earth boring drive unit which is either in the form of a rotating input unit or unit which pushes the pipe or rod along its axis to carry out the subterranean boring.

Recognizing the above mentioned stresses to be encountered by the coupling coaxially joining the pipe or rod sections, it is necessary that the coupling be capable of withstanding high axial compressive loads where the drive unit pushes the pipe along its axis and be capable of transmitting high torque loads where a rotary earth boring drive unit is employed to carry out subterranean boring. In both cases, it is important that the coupling be free from jamming even under the high load stresses encountered. Too frequently the couplings proposed in the prior art have either failed or have been prone to jamming under stress loads thereby rendering it difficult if not impossible to freely separate the coupled pipe or rod sections as necessary following the boring operation.

It is also important that the coupling used in joining the pipe or rod sections be capable of being quickly joined by hand and easily released, preferably without the necessity for utilizing special tools. These desired advantages for earth boring couplings have also been found locking in the prior art proposals.

SUMMARY OF THE INVENTION

The present invention offers an improved solution to the problem of providing a coupling for coaxially joining pipe or rod sections which then are to be driven by an earth boring drive unit to carry out a subterranean boring operation.

Generally, the coupling, hereinafter disclosed in detail, includes telescopically interengageable male and female members which, at least where the coupling is being employed injoining the ends of two pipe or rod sections, will have each of these members fixed to the end of a pipe or rod section as by being welded thereto. Typically, these pipe or rod sections will have a length of around five or ten feet each.

The telescopically interengageable male and female members of the coupling have mating irregular cross-sectional portions drivingly cooperable to transmit torque between the members of the coupling with releasable locking means carried by the members to lock them against axial separation from each other. The locking means includes an outwardly biased latch pivotably mounted in a pocket on the exterior of the male member and an inwardly opening recess on the interior of the female member into which the latch moves and lockingly engages when the members are telescopically interengaged. The locking engagement of the latch within the recess functions to transmit axial tension loads through the coupling as will be experienced when coupled pipe or rod sections are to be withdrawn by pulling them of the bore that they have formed.

Preferably, the mating irregular cross-sectional portions of the interengageable male and female members are made hexagonal to enable total transmission of torque loads between the members through these hexagonal cross-sectional portions without transmitting any torque load through interengagement between the latch and recess.

Similarly, in transmitting axial compressive loads through the coupling, it is preferred that the telescopically interengageable male and female members have abutment means which engage to transmit compressive axial loads without any load being transmitted through the latch and recess in the respective coupling members.

Likewise, the pivotal mounting of the spring biased latch within a pocket of the male member to move into a recess in the cavity of the female member is advantageous where the latch is loosely pivoted so that the latch itself, through its engagement at its respective ends with the recess and pocket, functions to transmit axial tension loads to keep the coupling members from separating.

With the above features of the invention generally in mind, it is a principal object to provide a coupling for coaxially joining pipe or rod sections which is essentially non-jamming with positive release of the coupling being possible even after heavy tension overload has been applied to the coupling.

A further important object of this invention is to provide a coupling as referred to in the above object where the latch part can be easily replaced should it become damaged in use.

Another important object of the invention is to provide a coupling as above mentioned which may be quickly joined by hand manipulation and easily released by utilizing conventional non-special tools to depress the latch into its pocket.

Another object of the invention is to provide a coupling for coaxially joining pipe or rod sections wherein normal compression and torsional work loads to which the coupling may be exposed do not overload or place stress on the latch portion of the coupling.

The invention has the further object of providing a coupling with a locking means employing a latch easily installed on a holding pin with the latch pocket being fully exposed to allow effective cleaning and oiling of the locking means.

The above and other objects of the invention will become apparent from consideration of the detailed description of a preferred embodiment thereof given in connection with the following drawings.

DESCRIPTION OF A PREFERRED EMBODIMENT

Figure 1:
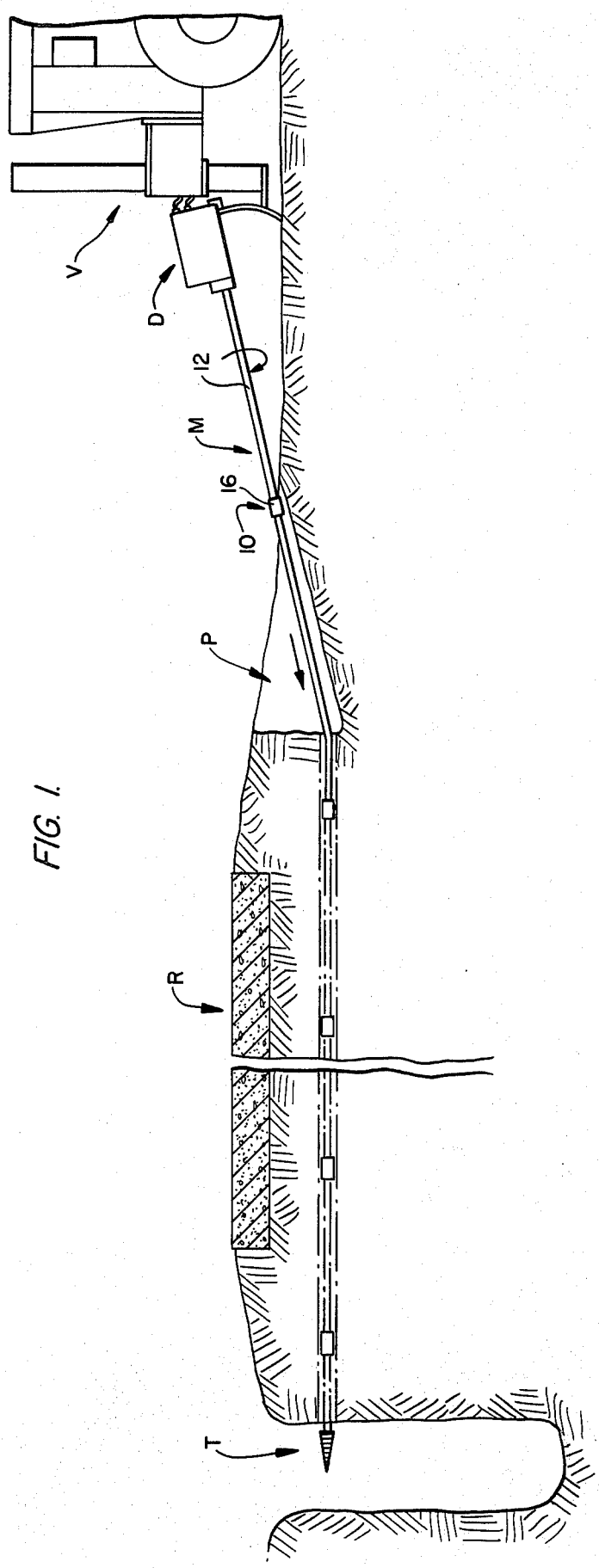
FIG. 1 is a view generally in section showing the environment in which the coupling invention for pipe or rod sections is employed with a rotary earth boring drive unit shown mounted on the backfill blade of a tractor vehicle for driving the coupled sections in a boring operation beneath a roadway.

FIG. 1 may be referred to as illustrating the general environment for use of the coupling invention. A rotary earth boring drive unit D is shown on FIG. 1 mounted on the backfill blade of a suitable tractor vehicle V. This drive unit D may be of the type designed for rotatably driving an elongated member M, such as a pipe, rod or the like, through a subterranean area. Such an earth boring operation can be used in laying a pipe line or cable from a work pit P under a roadway R to a target trench T located at the opposite side of the roadway. Drive unit D may be, as diagrammatically illustrated, of the rotary drive type which is coupled to elongated member M to drive it under roadway R toward target trench T in carrying out the desired earth boring operation. Such a horizontal boring unit which is hydraulically powered from the hydraulic system of vehicle V is manufactured by The Charles Machine Works, Inc. of Perry, Okla.

In utilizing the above generally described equipment, the elongated member M is characteristically provided by coaxially joining pipe or rod sections using a coupling 10 to releasably connect the adjoining ends of the pipe or rod sections that are to be driven through the subterranean area in performing the earth boring operation. It is this coupling 10 which constitutes the invention hereinafter described in detail.

Figure 2:
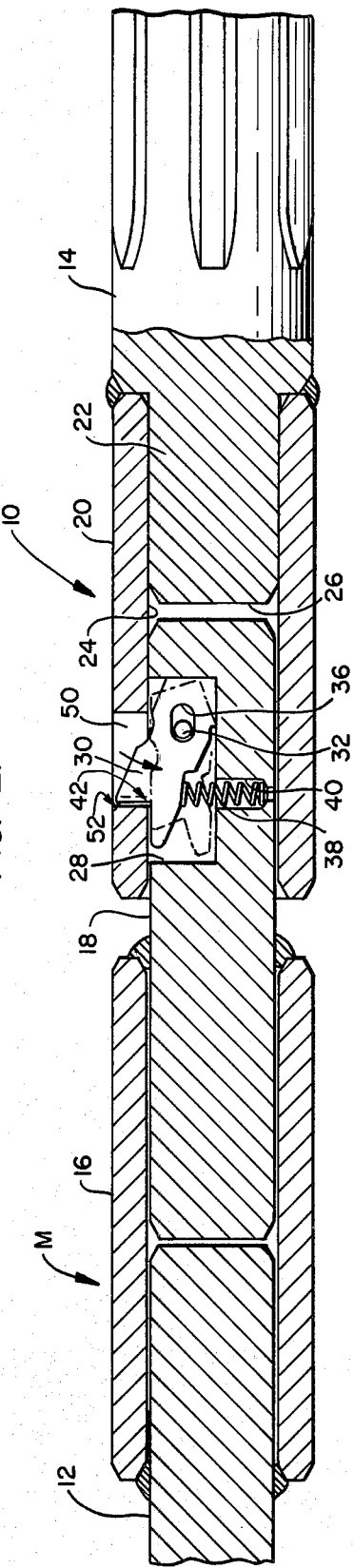
FIG. 2 is a sectional view of the coupling invention with its telescoping male and female members shown welded to the ends of a rod section and a splined stub respectively.

Coupling 10 is shown in section on FIG. 2 assembled as part of an elongated member M with a stem rod section 12 and a splined stub 14. A sleeve 16 is shown welded to stem section 12 and one member of coupling 10 in the relationship shown on FIG. 2.

The coupling 10 is made up of telescopically interengageable male member 18 and female member 20 with the coupling member 18 welded onto the end of sleeve 16 opposite stem section 12 and coupling member 20 welded onto the shaft portion 22 of splined stub 14.

Figure 3:
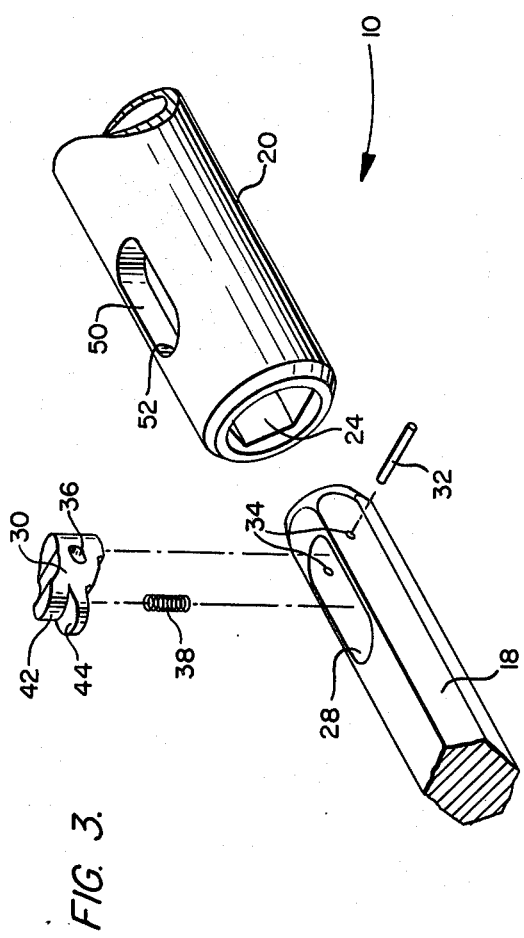
FIG. 3 is an exploded view of the parts making up the coupling.
Figure 4:
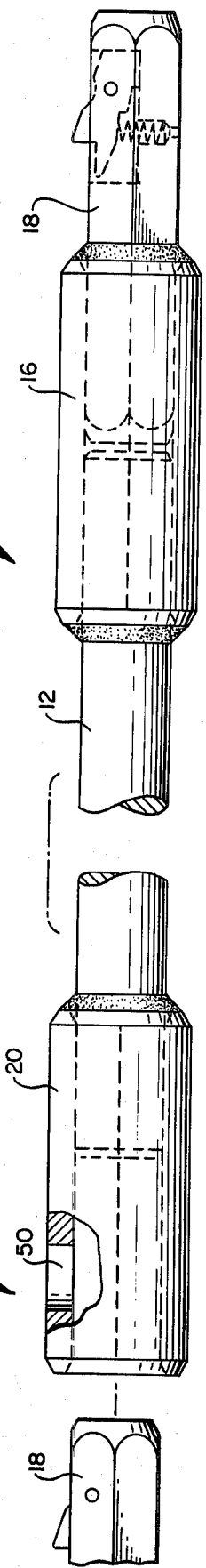
FIG. 4 is a side elevational view, with a portion in section, of couplings associated with the ends of a stem rod section.

The two members 18 and 20 with the associated parts that complete coupling 10 are shown in the exploded view of FIG. 3 on the drawings. FIG. 4 illustrates the manner in which a rod stem section 12, say in the order of five or ten feet in length, is appropriately welded into the assembly of an elongated member M to be employed with an earth boring drive unit D by its connection with a sleeve 16 and members 18 and 20 making up the coupler 10.

Important to the structure of the coupling 10 is the provision of a cavity 24 in female coupling member 20 into which the male coupling member 18 telescopically slides in assembling the coupling members for use. The extent of inward telescoping engagement of member 18 into cavity 24 is limited by an abutment 26 formed by the end of shaft portion 22 on splined stub 14 where such shaft portion extends down into the tubular end of coupling member 20 opposite the location of cavity 24. It will of course be recognized that other abutment means may be provided in cavity 24 than utilizing wall 26 to limit the extent of telescoping insertion of member 18 into cavity 24.

It is to be noted that the presence of an abutment means to limit telescopic interengagement between members 18 and 20 is important to transmitting axial compressive loads through the coupling 10. Where an earth boring drive unit D of the pusher type is employed to drive the elongate member M, these axial compressive loads will represent the major forces to be transmitted through coupling 10. But, even when a rotary type earth boring drive unit is employed to force an elongated member M through the subterranean area in a boring operation the axial compressive load is best transmitted through coupling 10 by the male member 18 engaging with an abutment means in cavity 24. The end wall of shaft portion 22 forms the bottom of cavity 24 in female coupling member 20 and easily forms abutment 26.

An important function of the abutment means in cavity 24 absorbing axial compressive loads applied through male coupling member 18 arises in avoiding transmission of any of these axial compressive loads through the locking means carried by the members 18 and 20. This locking means takes the form of the latch assembly hereinafter described which, in use, locks the coupling members against their axial separation from each other.

The telescopically interengageable members 18 and 20 are provided with mating irregular cross-sectional portions that drivingly cooperate to transmit torque loads between the members of coupling 10. Thus, member 18 has an elongate segment provided with a hexagonal exterior cross-section. Similarly, the interior of cavity 24 has an irregular cross-section throughout at least a portion of its length which is hexagonal in cross-section to matingly cooperate with the hexagonal cross-section of the segment of member 18 such that torque loads will be drivingly transmitted between the members 18 and 20 by reason of these cooperating hexagonal cross-sections.

Particularly, when the earth boring drive unit D applies rotary force to bore the elongate member M into the subterranean area as beneath a roadway R in a boring operation, the torque transmitting capability provided by the matingly cooperating hexagonal cross-sectional characteristics of members 18 and 20 is important. As in the case of avoiding transmission of axial compressive loads through the locking means carried by the members to lock them against axial separation from each other, the mating relationship between the irregular cross-section portions, i.e., hexagonal, by drivingly cooperating to transmit torque between the members, avoids transmission of such torque into or through the locking means provided by the latch assembly hereinafter described.

The components of the latch assembly that form the releasable locking means to lock coupling members 18 and 20 against axial separation from each other may best be described by reference to FIGS. 2 and 3 on the drawings. A pocket 28 is formed in male coupling member 18 to house a latch 30 pivotally mounted in pocket 28. The pivotal mounting is provided by a pin 32 supported in holes 34 drilled through the sidewalls of pocket 28 (FIG. 3) with latch 30 being provided adjacent one end thereof with an elongated bore 36 and pin 32 passing through such bore in the relation as shown in FIG. 2. The pin 32 in elongated bore 36 provides a loose or lost motion pivotal mounting for latch 30 within pocket 28 and relative to member 18 of the coupling 10. This relationship is advantageous in that the physical compressive strength of latch 30 may be effectively utilized in the locking means between the members 18 and 20 of coupling 10 without undesireably transmitting axial tension loads to which the coupling 10 may be exposed to the pivot pin 32 or its mounting in holes 34 at the sidewalls of pocket 28.

The latch 30 is biased outwardly of pocket 28 on its pivotal mounting pin 32 by a compression spring 38. As shown in FIG. 2, spring 38 is retained in a counterbored hole 40 which is located in the bottom wall of pocket 28 so that spring 38 rests on the shoulder of counterbored hole 40 and presses upwardly against the underside of a shoulder on latch 30. As may be seen from FIG. 2, the hole 40 which retains spring 38 opens entirely through the exterior of coupling member 18. This offers an advantage in use of the coupling 10 in that lubrication of the pivotally mounted latch 30 and spring 38 may be more easily effected. Also, accumulations of dirt or other foreign material in pocket 28 and counterbored hole 40 may be easily flushed out through the hole 40.

Instead of employing a coil spring 38, other outward biasing means for latch 30 may be provided. Advantageously, the space in pocket 28 beneath latch 30 can be essentially filled with a wedge of resilient material, such as a plastic foam, in place of spring 38. The resilient wedge offers the advantage over spring 38 of essentially filling the space around latch 30 in pocket 28 to prevent dirt, etc. from entering the pocket under latch 30.

Before describing the structure of female coupling member 20 with which the pivotally mounted latch 30 on member 18 is to cooperate, other important design features of latch 30 may be referred to.

The rear end portion of latch 30 that is fully housed within pocket 28 is preferably configured to cooperate with the contours of the adjacent wall portions of pocket 28. This may be most easily visualized by reference to FIG. 2. With latch 30 in fully projected position under the biasing force of spring 38 such as shown in solid lines on FIG. 2, the generally square rear portion of latch 30 is nested against a bottom wall portion and right wall portion of pocket 28. The dotted line showing of latch 30 on FIG. 2 shows the latch when it is fully depressed into pocket 28 against the biasing force of spring 38. The interengagement between the surfaces of the rear of latch 30 and immediately adjacent wall portions in pocket 28 provides an ideal load transferring area when axial tension loads are applied to coupling 10 with these loads being transmitted through latch 30 into the wall surfaces of pocket 28 and coupling member 18 in which such pocket is formed.

The outwardly projecting portion of latch 30 is also preferably formed to provide advantages to the locking means provided between coupling members 18 and 20 of coupling 10. This outer portion of latch 30 located above coil spring 38 has a notched leading end providing a curved wall portion 42 which is engageable with the abutment provided by the recess hereinafter described as formed in coupling member 20. The notched leading end also provides a lip 44 which extends away from the bore 36 by means of which the latch 30 is pivotally mounted on pin 32. The lip 44 under the biasing action of spring 38 urging latch 30 outwardly of pocket 28 will engage on the inside of cavity 24 of coupling member 20 so as to properly locate the latch 30 in the functioning of the locking means which retains members 18 and 20 of coupling 10 against axially separation from each other when the coupling is exposed to axial tension loads.

Referring now to the construction of female member 20 for its cooperation with latch 30 of male member 18 of coupling 10, in the illustrated embodiment a recess 50 is formed in the wall of member 20 opening inwardly of cavity 24 in such member. As shown, the recess 50 is a simple elongated opening with rounded or curved ends which extends fully through the wall of member 20 from hexagonal cavity 24 to the cylindrical exterior of member 20. While this configuration of recess 50 is not only simple to form in member 20 but also provides for easy access in depressing latch 30 down into its pocket 28 of member 18 when the locking means of coupling 10 is to be disengaged, it should be kept in mind that only a portion of the recess 50 need be open through the exterior of the female coupling member 20. Even a small opening to recess 50 would readily enable depressing latch 30 out of recess 50 when disengagement of the coupling members 18 and 20 is desired. Also, it will be recognized that recess 50 may be round or of another shape rather than elongated as shown on the drawings.

It may be pointed out that the notched leading end of latch 30 may advantageously have wall portion 42 contoured such as to cooperatingly engage with the adjacent curved abutment wall 52 of recess 50. This will give an area of surface contact between wall portion 42 and the abutment wall 52 of recess 50 so that latch 30 may more effectively act as a load transmitting element during application of axial tension loads to the coupling 10. Thus as discussed hereinabove, the latch 30 in the position of the parts shown on FIG. 2 has its end surfaces adjacent elongated aperture 36 nested against the immediately adjacent walls of pocket 28 in coupling member 18. At the same time, wall portion 42 on latch 30 is snuggly engaged against the abutment wall 52 of recess 50 in coupling member 20. It will be obvious that with axial tension loads applied to the coupling members 18 and 20 and the latch 30 in this relationship the physical compressive strength of latch 30 will be utilized to resist such loads rather than the load be applied to the pivotal mounting pin 32 or walls of pocket 28 in which such pin is mounted.

Having described the structural features of the coupling 10 hereinabove, several advantages for the coupling may now be summarized. Importantly, the structure of coupling 10 offers non-jamming characteristics even on exposure of the couping to high torque loads, compression loads or tension loads. The driving cooperation obtained by the mating hexagonal cross-sections of the male coupling member 18 and female coupling member 20 provides for excellent transmission of torque loads. Such large torque loads are distributed over the sizable area of the telescopically interengaged male and female members. Further, since the members 18 and 20 abut each other by member 18 pressing against the abutment 26 formed by the wall at the bottom of cavity 24 in member 20, normal compression loads are transmitted with the same beneficial efficiency as are torque loads.

Importantly, under normal compression and torsional loads, the locking means between coupling members 18 and 20 in the form of latch 30 and recess 50 is essentially not subjected to any of these stresses. Thus, positive release of the coupling by depressing latch 30 out of recess 50 may be simply achieved. Should a heavy tension overload be exerted against the coupling members 18 and 20, the physical strength of latch 30 by reason of its loose pivotal mounting and design of the parts serves to effectively transmit such tension load. If the latch 30 is overloaded, this part alone may easily be replaced, producing a cheaply repairable and thereafter fully usable non-jamming coupling.

The particular locking means between coupling members 18 and 20 assures a long service life without the worry of burr formation such as can be experienced with prior art threaded couplings for joining pipe or rod sections. The latch shape, hole size, internal clearances and utilization of heat treated parts all contribute to the anticipated long service life. The pin 32 holding the latch 30 is easily installed and the latch pocket 28 has the counterbored hole 40 extending completely therethrough to allow cleaning and oiling of the latch 30, spring 38, pocket 28, etc.

The coupling 10 can be quickly joined and easily released using only a screw driver to depress the latch 30 into its pocket 28. No special tools are required.

Also, the smooth, round outside surfaces of the members making up coupling 10 reduce the likelihood of projections, edges or discontinuities causing items to wrap around the rotating elongate member M.

Also importantly, torque loads can be transmitted through the coupling structure 10 in both clockwise and counterclockwise directions, unlike the limited capability available with a threaded type coupling.

While the forgoing constitutes a detailed description of a preferred embodiment of this invention, it is realized that various modifications thereof will occur to those skilled in the art. Therefore, the scope of the invention is to be considered as limited solely by the scope of the hereinafter appended claims.

I claim:

1. A coupling for coaxially joining pipe or rod sections in load transmitting relation to be employed with an earth boring drive unit comprising:

a first elongated member having a generally annular wall with the inner surface of said wall defining an axially opening cavity of polygonal cross-sectional throughout at least a portion of the length of said cavity, said wall being formed with a recess opening into such cavity;

a second member having an exterior surface formed with a pocket opening outwardly thereof, said second member further having an elongate segment telescopically engageable within said cavity, said segment being provided with an exterior cross-section configured to drivingly mate with said polygonal cross-section of the cavity to transmit torque between said members;

each of said members providing means remote from the telescopically interengageable portions thereof to affix the member to a pipe or rod section;

a mounting pin carried by said second member and extending transversely within said pocket;

a load transmitting latch in said pocket having an enlarged transverse bore loosely enclosing said pin for said latch to be capable of limited movement normal to the axis of said pin and pivot on said pin from within said pocket outwardly beyond said exterior surface of said second member;

biasing means urging said latch outwardly to engage within said recess of said first member when said members are interengaged in load transmitting relation;

abutment means in said first member cavity with which said second member engages when said elongate segment is telescoped into said cavity to transmit axially compressive loads through said members;

said recess providing an abutment wall against which said latch engages to lock said members against axial separation upon tension being applied to said members; and said pocket providing a stop wall to limit movement of said latch within said pocket, said latch transmitting axial tension loads applied to said coupling by simultaneous engagement of said latch with both said abutment wall and said stop wall, said latch bore being out of contact with said mounting pin when said simultaneous engagement occurs and said latch transmits said tension loads.

2. A coupling as recited in claim 1 wherein said recess in said inner surface of said annular wall of said first member has at least a portion thereof opening through the exterior of said annular wall to facilitate depressing said latch out of said recess when disengagement of said members is desired, said biasing means is a coil spring retained in a hole located in a bottom wall of said pocket, and said hole extends to the exterior of said second member whereby foreign material accumulating in said pocket may be cleared therefrom through said hole.

3. A coupling as recited in claim 1 wherein said latch has a notched leading end providing a wall portion engageable with said abutment wall of the recess and a lip engageable with the inner surface of said annular wall of said first member to limit outward pivoting of said latch from said pocket.

4. A coupling as reciting in claim 1 wherein said abutment wall of the recess and said stop wall of the pocket are shaped correspondingly to the end configurations of said latch with which they engage for the latch to serve as a load transmitting element during axial tension loads applied to the coupling.

* * * * *